Patented July 20, 1926.

1,593,514

UNITED STATES PATENT OFFICE.

ROBERT SUCHY, OF BITTERFELD, GERMANY, ASSIGNOR TO CHEMISCHE FABRIK GRIESHEIM-ELEKTRON, OF FRANKFORT-ON-THE-MAIN, GERMANY.

PRODUCTION OF PHOSPHORIC ACID.

No Drawing. Application filed December 15, 1925, Serial No. 75,611, and in Germany January 17, 1925.

This invention relates to the production of phosphoric acid by burning phosphorus or gas mixtures containing phosphorus and air. Owing to the large amount of heat produced by this reaction, the brick-work lining of the combustion chamber is vigorously attacked.

I have found that this attack can efficiently be avoided by constantly irrigating the walls of the combustion chamber with phosphoric acid solution, whereby, simultaneously, at least a part of the phosphorus pentoxide produced by the combustion is absorbed. This irrigation may be carried out in any desired manner. For instance, the combustion chamber may be made to have the form of a horizontal rotary tube in which a certain amount of phosphoric acid solution is contained, so that by the revolving tube some part of the phosphoric acid solution is continuously taken along and lifted. Another method of carrying out the invention consists in introducing the reaction gases, for instance in the form of a flame, into a vertical shaft, either from below or from the top, and irrigating the walls of the shaft with phosphoric acid solution.

I claim:—

In the process of producing phosphoric acid by burning phosphorus or gas mixtures containing phosphorus and air, the method of continuously irrigating the interior walls of the combustion chamber with phosphoric acid solution.

In testimony whereof I affix my signature.

ROBERT SUCHY.